United States Patent
Kato et al.

(10) Patent No.: US 7,278,503 B1
(45) Date of Patent: Oct. 9, 2007

(54) OPERATING APPARATUS FOR A WORKING INDUSTRIAL VEHICLE

(75) Inventors: Norihiko Kato, Aichi-ken (JP); Hisashi Ichijo, Aichi-ken (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 0 days.

(21) Appl. No.: 11/648,977

(22) Filed: Jan. 3, 2007

(30) Foreign Application Priority Data

Jan. 12, 2006 (JP) .............................. 2006-004297
Nov. 17, 2006 (JP) .............................. 2006-311777

(51) Int. Cl.
*B60K 1/00* (2006.01)

(52) U.S. Cl. .................. 180/65.4; 180/65.3; 180/65.2; 180/65.1; 903/921; 903/922

(58) Field of Classification Search ............... 180/65.1, 180/65.2, 65.3, 65.4, 6.48, 60, 214, 216, 180/220; 901/921, 922
See application file for complete search history.

(56) References Cited

U.S. PATENT DOCUMENTS

| | | | | |
|---|---|---|---|---|
| 6,018,198 A | * | 1/2000 | Tsuzuki et al. | 290/17 |
| 6,276,472 B1 | * | 8/2001 | Takashima et al. | 180/65.2 |
| 6,306,057 B1 | * | 10/2001 | Morisawa et al. | 475/5 |
| 6,558,289 B2 | * | 5/2003 | Chung | 477/3 |
| 6,656,082 B1 | * | 12/2003 | Yamada et al. | 477/5 |

FOREIGN PATENT DOCUMENTS

| | | |
|---|---|---|
| JP | 06-037220 A | 2/1994 |
| JP | 2002-093965 A | 3/2002 |
| JP | 2005-198443 A | 7/2005 |
| JP | 2005-298163 A | 10/2005 |

* cited by examiner

*Primary Examiner*—Christopher P. Ellis
*Assistant Examiner*—Cynthia F. Collado
(74) *Attorney, Agent, or Firm*—Knoble Yoshida & Dunleavy, LLC

(57) ABSTRACT

A two-way clutch is provided between an engine and a generator motor. Further, a battery and a cargo handling pump are provided. The generator motor is set to either a generator mode or an electric motor mode. When a cargo handling load (detected by a sensor) is small, the two-way clutch is set to a first state in which transmission of driving force from the engine to the generator motor is allowed and in which transmission of driving force in reverse is prevented. Further, when the engine is stopped or idled, the cargo handling pump is driven by the generator motor in the electric motor mode. When, during the above operation, the load increases to a level above a predetermined value, an increase in output of the generator motor and an increase in engine RPM are started, and when the engine RPM becomes equal to the RPM of the generator motor, which previously increased, the two-way clutch in the first state is connected, and the cargo handling pump is driven by the engine.

4 Claims, 3 Drawing Sheets

OPERATING APPARATUS FOR A WORKING INDUSTRIAL VEHICLE

BACKGROUND OF THE INVENTION

1. Field of the Invention

The present invention relates to a so-called hybrid type operating apparatus provided in a working industrial vehicle.

2. Description of the Related Art

An example of a operating apparatus for an industrial vehicle of this type is disclosed in JP 2005-298163 A. According to the first embodiment of JP2005-298163A (see FIG. 1), there is disclosed a cargo handling apparatus for a cargo handling industrial vehicle having an engine, a generator motor, a clutch for connecting and disconnecting power between the engine and the generator motor, an electricity storage means, a cargo handling means (load to be driven), and a cargo handling load detecting means for detecting resistance load. The generator motor is set to either a generator mode in which a driving force of the engine is transmitted to the generator motor through the clutch to generate power and store the power in the electricity storage means, or an electric motor mode in which the generator motor is supplied with driving power from the electricity storage means to function as an electric motor.

In the above construction, when the load detected by the cargo handling load detecting means is small, the clutch is set to a disconnected state to stop or idle the engine, and the cargo handling means is driven by the generator motor in the electric motor mode to perform cargo handling operations. When, during the cargo handling operation, the cargo handling load detecting means detects an increase in load in excess of a predetermined value, an increase in engine RPM is started while increasing an output of the generator motor in the electric motor mode. When the engine RPM becomes equal to the RPM of the generator motor, the clutch is set to a connected state, and the driving force of the engine is transmitted to the cargo handling means to perform cargo handling operations.

Further, according to the first embodiment of JP 2005-298163 A, the engine is started through cranking by the generator motor in the electric motor mode with the clutch in the connected state.

According to the third embodiment of JP 2005-298163 A (see FIG. 3), there is disclosed a construction in which the engine and the generator motor are connected to each other through the intermediation of a one-way clutch instead of the above-mentioned clutch. With this construction, when, during cargo handling operations, the cargo handling load detecting means detects an increase in load in excess of a predetermined value, an increase in the engine RPM is started while increasing the output of the generator motor in the electric motor mode. When the engine RPM becomes equal to the RPM of the generator motor, the one-way clutch is automatically connected, and the driving force of the engine is transmitted to the cargo handling means.

With this construction, there is no need to perform the clutch connection/disconnection control (inclusive of control for monitoring to check whether the engine RPM has become equal to the RPM of the generatormotor) required in the first embodiment described above, thereby achieving a simplification in electrical construction.

However, with the construction of the third embodiment of JP 2005-298163 A, it is impossible to drive the engine by the generator motor because the one-way clutch is then set to the disconnected state. Thus, to start the engine, it is necessary to provide a dedicated starter motor, which means there is some room left for improvement (see the second and third sentences of paragraph [0063] of JP 2005-298163 A).

SUMMARY OF THE INVENTION

The present invention has been made in view of the above problem in the prior art. It is an object of the present invention to make further use of a generator motor as a drive source while maintaining the simplicity in electrical construction of the clutch connection/disconnection control as in the third embodiment of JP 2005-298163 A.

According to the present invention, there is provided an operating apparatus for a working industrial vehicle, including: an engine; a generator motor; a two-way clutch provided between the engine and the generator motor; an electricity storage means, a load driven by at least one of the engine and the generator motor, and a working load detecting means for detecting the magnitude of a resistance load during operation.

The generator motor is set to either a generator mode in which the driving force of the engine is transmitted to the generator motor through the two-way clutch to generate power and store the power in the electricity storage means, or an electric motor mode in which the generator motor is supplied with driving power from the electricity storage means to function as an electric motor. The two-way clutch allows switching between a first state in which the transmission of driving force from the engine to the generator motor is allowed and in which the transmission of driving force from the generator motor to the engine is prevented, and a second state in which the transmission of the driving force from the generator motor to the engine is allowed and in which the transmission of the driving force from the engine to the generator motor is prevented.

The "increase in resistance load to a level above a predetermined value" includes a case in which the degree of rapidity in the increase in resistance load is higher than a predetermined degree of rapidity, and a case in which the resistance load itself is not less than a predetermined value. This applies to the following description.

DESCRIPTION OF THE PREFERRED EMBODIMENT

Figure 1:
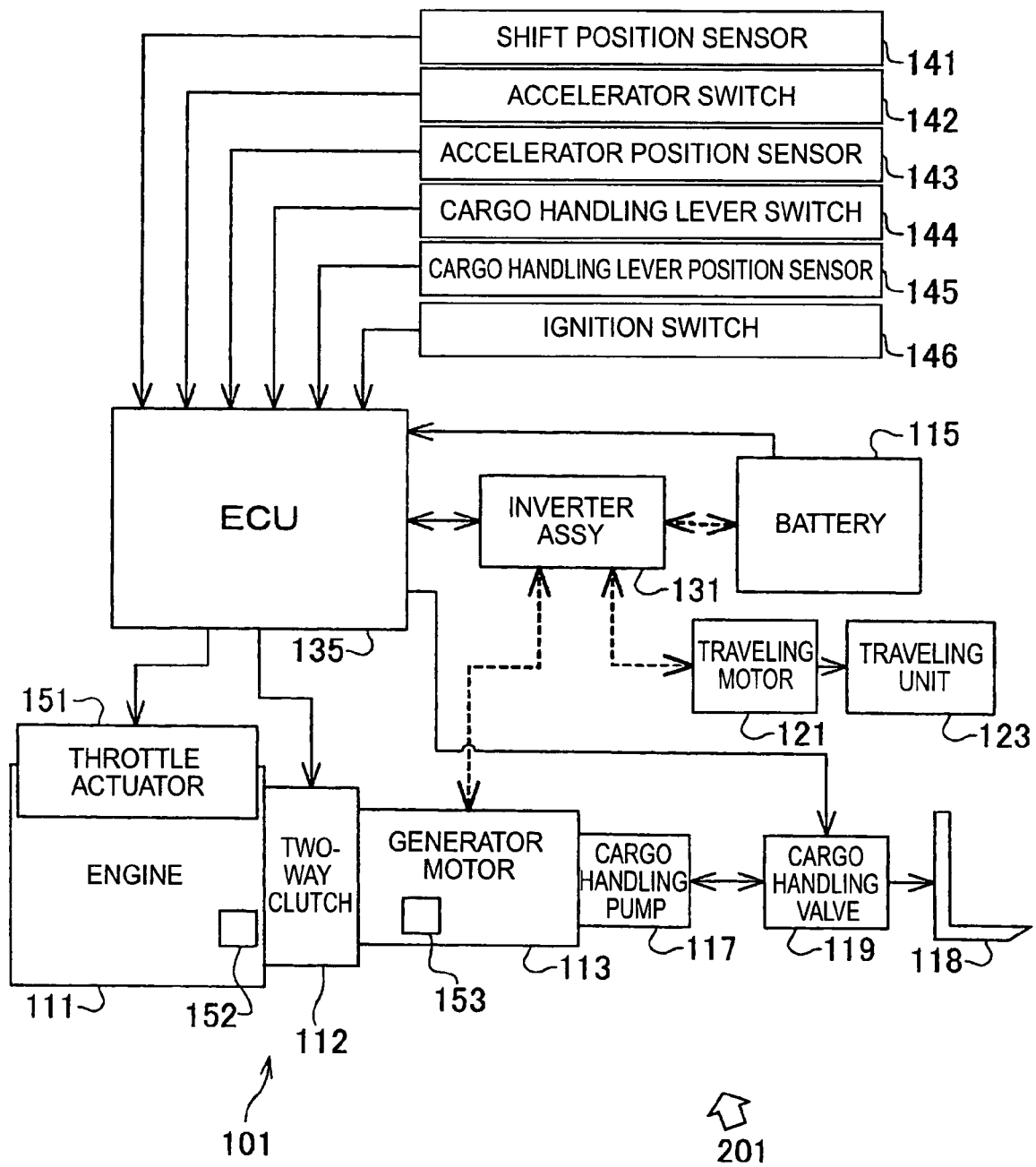
FIG. 1 is a block diagram showing a forklift equipped with a cargo handling apparatus according to an embodiment of the present invention.
Figure 2A:
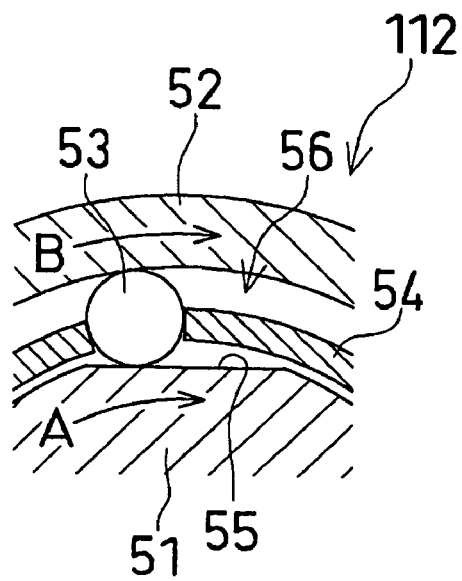
FIG. 2A is a partial sectional view showing a two-way clutch in a first state.
Figure 2B:
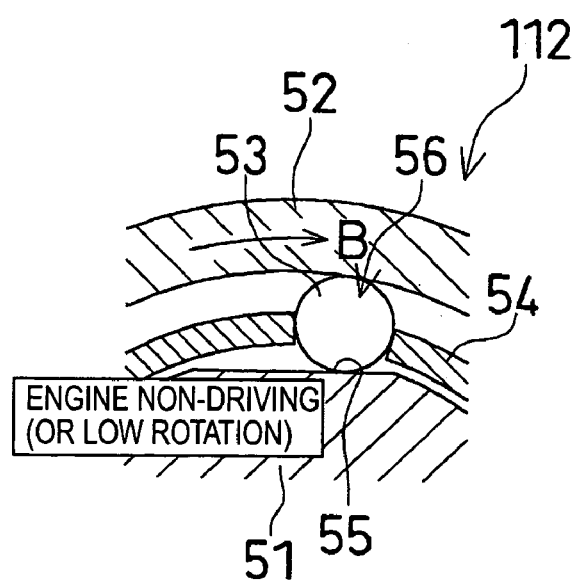
FIG. 2B is a partial sectional view showing the two-way clutch in a second state.

Next, an embodiment of the present invention will be described. FIG. 1 is a block diagram showing a forklift equipped with a cargo handling apparatus according to an embodiment of the present invention, FIG. 2A is a partial sectional view showing a two-way clutch in a first state, and FIG. 2B is a partial sectional view showing a the two-way clutch in a second state.

FIG. 1 shows the general construction of a cargo handling apparatus (working device) 201 of a forklift 101 as a working industrial vehicle. The cargo handling apparatus 201 is mainly composed of an engine 111, a generator motor 113, a battery (electricity storage means) 115, a cargo handling pump 117, a cargo handling valve 119, a fork 118, a traveling motor 121, a traveling unit 123, an inverter assembly 131, and an ECU (control means) 135. The cargo handling pump 117, the fork 118, and the cargo handling valve 119 form a cargo handling means (working means). In this embodiment, the cargo handling pump 117 corresponds to a load driven by the engine 111 and the generator motor 113.

The driving of the engine 111 is controlled based on a rotation control signal imparted to a throttle actuator 151 from the ECU 135 described below. A crankshaft (not shown) of the engine is coaxially connected with a drive shaft (not shown) of the generator motor 113 through the intermediation of a two-way clutch 112 for connection/disconnection of power.

The generator motor 113 can be switched as appropriate between a generator mode in which the generator motor 113 is driven by the engine 111 to generate power and store the power in the battery 115, and an electric motor mode in which the generator motor 113 is supplied with driving power from the battery 115 to function as an electric motor. The switching control is effected based on a control command supplied from the ECU 135 through the inverter assembly 131.

The forklift 101 is equipped with sensors, etc., which include a shift position sensor 141, an accelerator switch 142, an accelerator position sensor 143, a cargo handling lever switch 144, a cargo handling lever position sensor (cargo handling load detecting means) 145, and an ignition switch 146. Each of these sensors, etc. is electrically connected to the ECU 135.

When the generator motor 113 is in the generator mode, the engine 111 serves as the drive source for the generator motor 113 and the cargo handling pump 117 arranged coaxially therewith. On the other hand, when the generator motor 113 is in the electric motor mode, both the engine 111 and the generator motor 113, or the generator motor 113 alone serves as the drive source for the cargo handling pump 117.

FIG. 2A is a schematic partial sectional view of a construction example of the two-way clutch 112, which is equipped with a cam shaft 51 fixed to the crankshaft of the engine 111, an annular outer ring 52 arranged in the outer periphery of the cam shaft 51 and fixed to the drive shaft of the generator motor 113, a plurality of rollers 53 arranged circumferentially between the cam shaft 51 and the outer ring 52, and a retainer 54 supporting the rollers 53. The two-way clutch 112 is further equipped with an electromagnet (not shown). By switching between energization and non-energization of the electromagnet, the phase of the retainer 54 with respect to the cam shaft 51 is changed, whereby it is possible to change the positions of the rollers 53 in what may be termed wedge-shaped spaces 56 described below.

The outer peripheral surface of the cam shaft 51 is partially cut into flat surfaces to form cam surfaces 55. The portions corresponding to the cam surfaces 55 form the wedge-shaped spaces 56 between the cam shaft 51 and the outer ring 52. Each wedge-shaped space 56 is configured such that its width is maximum at the center in the circumferential direction while its width gradually diminishes toward both circumferential ends. In the wedge-shaped spaces 56, there are arranged the rollers 53 supported by the retainer 54.

The width of the central portion in the circumferential direction of each wedge-shaped space 56 is set somewhat larger than the outer diameter of the rollers 53, so when the rollers 53 are respectively situated at the circumferential centers of the wedge-shaped spaces 56, the cam shaft 51 and the outer ring 52 slip with respect to each other. When the retainer 54 is displaced to move each roller 53 to either end of each wedge-shaped space 56, it is possible to jam the rollers 53 in the wedge-shaped spaces 56. In this state, it is possible to transmit to the outer ring 52 the rotation of the cam shaft 51 in the direction in which the jamming is intensified (or to transmit to the camshaft 51 the rotation of the outer ring 52 in the direction in which the jamming is intensified).

While FIGS. 2A and 2B only shows the cam surface 55, the wedge-shaped space 56, and one roller 53, a plurality of similar structures are circumferentially arranged around the cam shaft 51, thereby forming the two-way clutch 112.

In the above-described two-way clutch 112, in the state shown, for example, in FIG. 2A, the rollers 53 are moved to the left through the intermediation of the retainer 54 to be jammed between the cam shaft 51 and the outer ring 52. When, in this state, the engine 111 is driven to rotate the cam shaft 51 in the direction of an arrow A, the rollers 53 make a relative movement to the left-hand side in FIG. 2A, that is, in the direction in which the wedge-engagement, in which they are jammed between the cam shaft 51 and the outer ring 52, is further intensified. Thus, the above-mentioned rotation of the cam shaft 51 is transmitted to the outer ring 52 through the rollers 53, thereby making it possible to drive the drive shaft of the generator motor 113 fixed to the outer ring 52 in the direction of an arrow B.

When, in the state of FIG. 2A, the generatormotor 113 is driven to rotate the outer ring 52 in the direction of the arrow B, the rollers 53 are dragged by the outer ring 52 to move to the right (to the respective circumferential centers of the wedge-shaped spaces 56), so the engagement between the cam shaft 51 and the outer ring 52 through the intermediation of the rollers 53 is canceled. Thus, the outer ring 52 slips relative to the cam shaft 51, and it is impossible to drive the cam shaft 51 (that is, crankshaft of the engine 111) in the direction of the arrow A.

On the other hand, in a case where the two-way clutch 112 is switched to the state of FIG. 2B, when the generator motor 113 drives the outer ring 52 in the direction of the arrow B relative to the engine 111 in a non-driving state or a low rotational state such as an idling state (when the engine 111 is in the low rotational state such as the idling state, the generator motor 113 drives the outer ring 52 at an RPM substantially higher than the RPM of the engine 111), the rollers 53 make a relative movement to the left in FIG. 2B to respectively move to the circumferential centers of the wedge-shaped spaces 56, so the engagement between the cam shaft 51 and the outer ring 52 through the intermediation of the rollers 53 is canceled. In this state, the outer ring 52 slips relative to the cam shaft 51. Thus, the outer ring 52 (that is, the drive shaft of the generator motor 113) can rotate in the direction of the arrow B without receiving the load of the engine in the non-driving state.

On the other hand, when the generator motor 113 further drives the outer ring 52 in the direction of the arrow B relative to the engine 111 in the non-driving state or the low rotational state such as the idling state, the rollers 53 are dragged by the outer ring 52 to move to the right in FIG. 2B to be jammed between the cam shaft 51 and the outer ring 52, so the above-mentioned rotation of the outer ring 52 is transmitted to the cam shaft 51, making it possible to generate a force for driving the cam shaft 51 (that is, the crankshaft of the engine 111) in the same direction as that of the arrow B.

As described above, in this embodiment, the two-way clutch 112 can be switched between the state of FIG. 2A, in which the transmission of driving force from the engine 111 to the generator motor 113 is allowed and in which the transmission of driving force from the generator motor 113 to the engine 111 is prevented, and the state of FIG. 2B, in which the transmission of the driving force from the generator motor 113 to the engine 111 is allowed and in which the transmission of the driving force from the engine 111 to the generator motor 113 is prevented.

In other words, in the state of FIG. 2A, when the RPM of the engine 111 is higher than the RPM of the generator motor 113, the two-way clutch 112 is in the connected state and transmits the driving force, whereas, when the RPM of the generator motor 113 is higher than the RPM of the engine 111, the two-way clutch 112 is in the disconnected state and transmits no driving force. Similarly, in the state of FIG. 2B, when the RPM of the generator motor 113 is higher than the RPM of the engine 111, the two-way clutch 112 is in the connected state and transmits driving force acting in the same direction as that of the arrow B. In the following, the state of FIG. 2A will be referred to as "first state", and the state of FIG. 2B will be referred to as "second state". The switching between the first state and the second state is effected through switching between energization and non-energization of the above-mentioned electromagnet based on a switching signal from the ECU 135.

The battery 115 stores the electricity generated by the generator motor 113 in the generator mode (and the traveling motor 121), and supplies, as needed, driving power for the traveling operation and cargo handling operation of the forklift 101 as appropriate. The storage and discharge of electricity in and from the battery 115 is controlled through the inverter assembly 131 connected to the ECU 135.

The traveling operation of the forklift 101 is effected through the traveling motor 121 and the traveling unit 123 driven by the traveling motor 121. The traveling motor 121 is driven by driving power supplied from the battery 115 through the inverter assembly 131. The cargo handling operation of the forklift 101 is effected through the cargo handling pump 117, the fork 118, and the cargo handling valve 119 for distributing, as appropriate, working fluid from the cargo handling pump 117 to the fork 118 side (more specifically, to a mast raising/lowering cylinder).

The ECU 135 performs system control on the forklift 101 as a whole, and the system control includes storage/discharge control for the battery 115. Input as appropriate to the ECU 135 are shift position information detected by the shift position sensor 141, accelerator ON/OFF information detected by the accelerator switch 142, accelerator opening information detected by the accelerator position sensor 143, cargo handling lever ON/OFF information detected by the cargo handling lever switch 144, cargo handling lever opening information detected by the cargo handling lever position sensor 145, ON/OFF information detected by the ignition switch 146, information on the engine 111 such as RPM (which can be detected by an RPM detecting sensor 152) and temperature, voltage/temperature information on the battery 115, information on the generator motor 113 such as RPM (which can be detected by an RPM detecting sensor 153), output, temperature, etc.

Based on the input information as mentioned above, a control signal for the engine 111 is output from the ECU 135 to the throttle actuator 151. Further, various control signals, such as a mode switching signal for the generator motor 113, an electricity storage control signal for the battery 115, and a control signal for the traveling motor 121, are output from the ECU 135 to the inverter assembly 131 to perform system control on the forklift 101. Further, the ECU 135 outputs a switching signal to the two-way clutch 112 to perform control for switching the two-way clutch 112 between the first state and the second state.

Next, the operation of the operating apparatus of this embodiment will be described. In particular, when no high output is needed for the cargo handling operation, the two-way clutch 112 is set to a state (that is, the first state shown in FIG. 2A) in which it is possible to drive the generator motor 113 from the engine 111 side but in which it is impossible to drive the engine 111 from the generator 113 side. The generator motor 113 is set to the generator mode.

In this state, the engine 111 serves as a drive source for both the generator motor 113 in the generator mode and the cargo handling pump 117. In the following, this state will be referred to as a "first mode". In this embodiment, the judgment as to whether high output is needed for the cargo handling operation or not is made by the ECU 135, which checks as appropriate whether there is a high demand for cargo handling drive or not based on information from the cargo handling lever position sensor 145.

In the first mode, the driving force of the engine 111 is transmitted to the generator motor 113 in the generator mode, and the electricity generated by the generator motor 113 is successively stored in the battery 115. The cargo handling pump 117 is constantly driven as the crankshaft of the engine 111 rotates, supplying working fluid (pressure oil in this embodiment) to the cargo handling valve 119. When no cargo handling operation is to be conducted, the working fluid passes through the cargo handling valve 119 to be fed back to a tank (not shown).

In the first mode, when the cargo handling load (resistance load) is small, the ECU 135 performs control, for example, to increase the amount of generated electricity to be stored in the battery 115, effecting control such that the load on the engine 111 is of a magnitude suitable for operating the engine 111 under a predetermined optimum condition. The optimum condition is a condition (in terms of RPM, fuel injection amount, etc.) allowing operation of the engine at optimum fuel efficiency, and is previously determined by experiment or the like. In a case, for example, in which the cargo handling load is small with the battery 115 almost fully charged, control may be conducted by the ECU 135 so as to prevent power generation by the generator motor 113.

When the forklift 101 is to be moved, the ECU 135 causes the battery 115 to discharge through the inverter assembly 131, supplying driving power to the traveling motor 121. By driving the traveling motor 121, the traveling unit 123 connected to the traveling motor 121 performs the moving operation.

When high output is needed for the cargo handling operation, that is, when it is judged by the ECU 135 that there is a high demand for cargo handling drive based on information from the cargo handling lever position sensor 145, the ECU 135 transmits a control signal to switch the generator motor 113 to the electric motor mode. The ECU 135 outputs a switching signal to switch the two-way clutch 112 to the state in which it is possible to drive the engine 111 from the generator motor 113 side but in which it is impossible to drive the generator motor 113 from the engine 111 side (that is, the second state shown in FIG. 2B). In the following, this state will be referred to as a "second mode".

In the second mode, the cargo handling pump 117 is driven by both the engine 111 and the generator motor 113 in the electric motor mode. Thus, the driving of the cargo handling pump 117 by the engine 111 is assisted by the generator motor 113 in the electric motor mode, thereby making it possible to execute a high-output cargo handling operation to a sufficient degree even if the engine 111 is of a low output type.

When the cargo handling drive demand is relatively low, and it is determined by the ECU 135 that there is no need for such an output as would require cooperation of the engine 111 and the generator motor 113 in the electric motor mode, the ECU 135 outputs a control signal to set the generator motor 113 to the electric motor mode. The two-way clutch 112 is set to the first state mentioned above. In this case, while the generator motor 113 in the electric motor mode drives the cargo handling pump 117, the engine 111 does not contribute to the driving of the cargo handling pump 117. In the following, this state will be referred to as a "third mode".

In the third mode, the engine 111 is idled or stopped, thereby improving the energy efficiency at the time of driving the cargo handling pump 117. Further, since the two-way clutch 112 is in the first state, there is no fear of a large load (engine braking) being applied from the engine 111 side when the generator motor 113 drives the cargo handling pump 117.

During the cargo handling operation in the third mode, there may arise a case in which the cargo handling load increases as a result, for example, of an increase in the opening of the cargo handling lever position sensor 145. Upon detection of the increase in the cargo handling load, the ECU 135 examines the degree of increase (rapidity) in the cargo handling load. For example, when the cargo handling lever is tilted by an angle larger than a predetermined angle within a predetermined period of time, it is determined that the degree of increase (rapidity) in the cargo handling load is large.

When it is determined by the ECU 135 that the degree of increase in the cargo handling load is below a predetermined value, the ECU 135 transmits a control signal to the inverter assembly 131 to simply increase the output of the generator motor 113 in the electric motor mode, thereby keeping up with the increase in the cargo handling load. At this time, the engine 111 maintains the idling state or the stopped state, thereby achieving an improvement in energy efficiency.

On the other hand, when the degree of increase in the cargo handling load is not less than the predetermined value, control is effected such that the output of the generator motor 113 in the electric motor mode is increased and that the increase in the RPM of the engine 111 is started immediately (If the engine 111 is stopped, the engine 111 is started at once, and an increase in the RPM of the engine is started). As compared with the engine 111, the generator motor 113 allows quicker transition to a high output state, so the delay in the cargo handling operation can be minimized or substantially reduced to zero.

At the stage where the RPM of the engine 111 has gradually increased to become equal to the RPM of the generator motor 113, the two-way clutch 112, which has been in the first state, is automatically connected, and the driving force of the engine 111 is transmitted to the cargo handling pump 117.

As described above, when the cargo handling load is relatively small, the cargo handling apparatus is set to the third mode to idle or stop the engine 111 to thereby achieve an improvement in energy efficiency (fuel efficiency). When, in the third mode, the cargo handling load (rapidly) increases beyond the predetermined value, switching is effected to the driving of the cargo handling pump 117 by the engine 111, whereby it is possible to conduct the cargo handling operation nimbly by utilizing the large output provided by the engine 111. To set the engine 111, which has been idling or stopped, to a high output state to effect transition to the driving by the engine 111, generation of some time lag is inevitable. This, however, can be coped with by quickly increasing the output of the generator motor 113, so there is no fear of a delay in the cargo handling operation due to a reduction in operational responsiveness, nor is there any reduction in operational efficiency involved in the cargo handling operation.

Further, when the RPM of the engine 111 becomes equal to the RPM of the generator motor 113, the two-way clutch 112 in the first state is automatically connected, so it is possible to avoid a temporary reduction in the input RPM of the cargo handling pump 117 at the time of transition to the driving by the engine 111. Thus, during the operation of lifting a cargo, there is no fear of the speed at which the fork 118 is raised being reduced temporarily to cause an unpleasant vibration in the machine or a delay in the cargo handling operation.

Further, as compared with the construction (construction of the first embodiment of JP 2005-298163 A) in which the engine RPM and the RPM of the generator motor 113 are monitored on the ECU 135 side and in which the electromagnetic clutch is connected when the engine RPM becomes equal to the RPM of the generator motor 113, it is possible to reduce the load on the ECU 135, and to simplify the electrical construction thereof. Further, since there is no need to perform electrical control, it is possible to reduce the frequency of failure, thereby reducing the frequency of maintenance.

Next, control at the time of engine start will be described. When the ignition switch 146 is turned ON while the engine 111 is stopped, the ECU 135 immediately transmits a switching signal to the two-way clutch 112 to effect switching to the state (second state of FIG. 2B) in which transmission of driving force from the generator motor 113 to the engine 111 is allowed and in which transmission of driving force from the engine 111 to the generator motor 113 is prevented. Then, the generator motor 113 is set to the generator mode, and the crankshaft (not shown) of the engine 111 is driven through the two-way clutch 112 (cranking). This causes the engine 111 to be started, and after that, the forklift 101 performs traveling operation, cargo handling operation, etc. according to the manipulation performed.

Due to the above-described construction, it is possible to omit a special starter motor for starting the engine 111, so it is possible to reduce the number of components and the production costs. Further, since it is a general practice for the generator motor 113 in the electric motor mode to be designed so as to have a larger torque than a starter motor, it is possible to reduce the vibration at the time of cranking.

Next, a regenerative brake in the traveling motor 121 will be described. In this embodiment, like the generator motor 113, the traveling motor 121 is set to either a generator mode or an electric motor mode. In the generator mode, the traveling motor 121 is supplied with driving power from the battery 115 and serves as an electric motor, thereby driving the traveling unit 123 as described above to cause the forklift 101 to travel. On the other hand, at the time, for example, of braking the forklift 101, the traveling unit 123 is set to the generator mode. The traveling motor 121 is driven from the traveling unit 123 side to generate power, and the power generated is stored in the battery 115.

Here, suppose a large amount of power is supplied to the battery 115 from the traveling motor 121 in the generator mode as in a case in which the forklift 101 is going down a long downward slope, and the battery 115 is almost fully charged. If, in this state, the power from the traveling motor 121 is continuously supplied, the battery 115 is overcharged, resulting in a marked reduction in the service life of the battery 115.

In view of this, in this embodiment, the ECU 135 detects and monitors the charging amount of the battery 115 by an appropriate method, such as voltage detection. When it is determined that the charging amount of the battery 115 is in excess of a predetermined charging amount (for example, a predetermined value corresponding to approximately 80% to 90% of the full charging amount), the ECU 135 switches the two-way clutch 112 to the second state, and stops (or idles) the engine 111. Further, the generatormotor 113 is driven in the electric motor mode to drive the crankshaft of the engine 111. As a result, the generator motor 113 is driven while braking the engine, so any surplus energy that cannot be stored in the battery 115 can be efficiently consumed (discharged) by the generator motor 113, thereby making it possible to rationally avoid overcharging of the battery 115.

As described above, the cargo handling apparatus 201 of the forklift 101 of this embodiment is equipped with the engine 111, the generator motor 113, the two-way clutch 112 provided between the engine 111 and the generator motor 113, the battery 115, the cargo handling pump 117 for driving the fork 118, and the cargo handling lever position sensor 145. The generator motor 113 is set to either the generator mode, in which the driving force of the engine 111 is transmitted to the generator motor 113 through the two-way clutch 112 to generate power to charge the battery 115 with, or the electric motor mode, in which the generator motor 113 is supplied with driving power from the battery 115 to function as an electric motor. The two-way clutch 112 can be switched between the first state (FIG. 2A), in which transmission of driving force from the engine 111 to the generator motor 113 is allowed and in which transmission of driving force from the generator motor 113 to the engine 111 is prevented, and the second state (FIG. 2B), in which transmission of driving force from the generator motor 113 to the engine 111 is allowed and in which transmission of driving force from the engine 111 to the generator motor 113 is prevented. When the cargo handling load detected by the cargo handling lever position sensor 145 is small, the cargo handling apparatus is set to the above-mentioned third mode, the two-way clutch 112 is set to the first state, and the engine 111 is stopped or idled. Further, the cargo handling pump 117 is driven by the generator motor 113 in the electric motor mode to perform cargo handling operations. When, during the operation in the third mode, the cargo handling lever position sensor 145 detects an increase in cargo handling load beyond a predetermined level, an increase in the RPM of the engine 111 is started while increasing the output of the generator motor 113. When the engine RPM becomes equal to the RPM of the generator motor 113, the two-way clutch 112 in the first state is automatically connected, and the driving force of the engine 111 is transmitted to the cargo handling pump 117 through the two-way clutch 112 to perform cargo handling operation using the fork 118.

Thus, when the cargo handling load is small, the two-way clutch 112 is set to the first state to drive the cargo handling pump 117 by the generator motor 113 in the electric motor mode, and the engine 111 is stopped or idled, thereby achieving an improvement in terms of energy efficiency. When an increase in cargo handling load is detected by the cargo handling lever position sensor 145, control is first effected to increase the output of the generator motor 113 to thereby secure responsiveness. When it is in the first state, the two-way clutch 112 transmits torque from the engine 111 to the generator motor 113, and cuts off torque transmission in the reverse direction, so it is possible to reliably prevent a load (engine braking, etc.) from the engine 111 side from being applied to the generator motor 113. When the engine RPM becomes equal to the RPM of the generator motor 113, the two-way clutch 112 in the first state is automatically connected, so there is no need to perform a special clutch connection/disconnection control, thereby making it possible to simplify the electrical construction of the ECU 135.

Further, by setting the two-way clutch to the second state as appropriate, it is also possible to drive the engine 111 side by the generator motor 113 in the electric motor mode.

Further, in this embodiment, when the ignition switch 146 is turned ON, the crankshaft of the engine 111 is driven by the generator motor 113 in the electric motor mode while setting the two-way clutch 112 to the second state (FIG. 2B), thereby starting the engine.

Thus, it is possible to effect cranking of the engine 111 by the generator motor 113 in the electric motor mode, so it is possible to omit a dedicated starter motor for starting the engine 111, thereby simplifying the construction of the cargo handling apparatus 201. Further, due to the large torque of the generator motor 113 in the electric motor mode, it is possible to reduce vibration at the time of cranking.

Further, in this embodiment, when the charging amount of the battery 115 is in excess of a predetermined charging amount, the two-way clutch 112 is set to the second state (FIG. 2B), and the crankshaft of the engine 111 is driven by the generator motor 113 in the electric motor mode.

Thus, by driving the generator motor 113 in the electric motor mode during engine braking, it is possible to efficiently discharge the energy of the battery 115, thereby making it possible to prevent the battery 115 from being overcharged.

Further, in this embodiment, when the cargo handling load detected by the cargo handling lever position sensor 145 is large, the cargo handling apparatus is set to the second mode, and the two-way clutch 112 is set to the second state (FIG. 2B) to perform operation by transmitting the driving force of the generator motor 113 in the electric motor mode and of the engine 111 to the cargo handling pump 117.

Thus, the driving of the cargo handling pump 117 by the engine 111 is assisted by the generator motor 113 in the electric motor mode, so, even when, for example, the engine 111 is of a low output type, it is possible to conduct high output operation to a sufficient degree.

Apart from the plurality of embodiments and modifications of the present invention described above, the present invention further allows the following modification.

Figure 3:
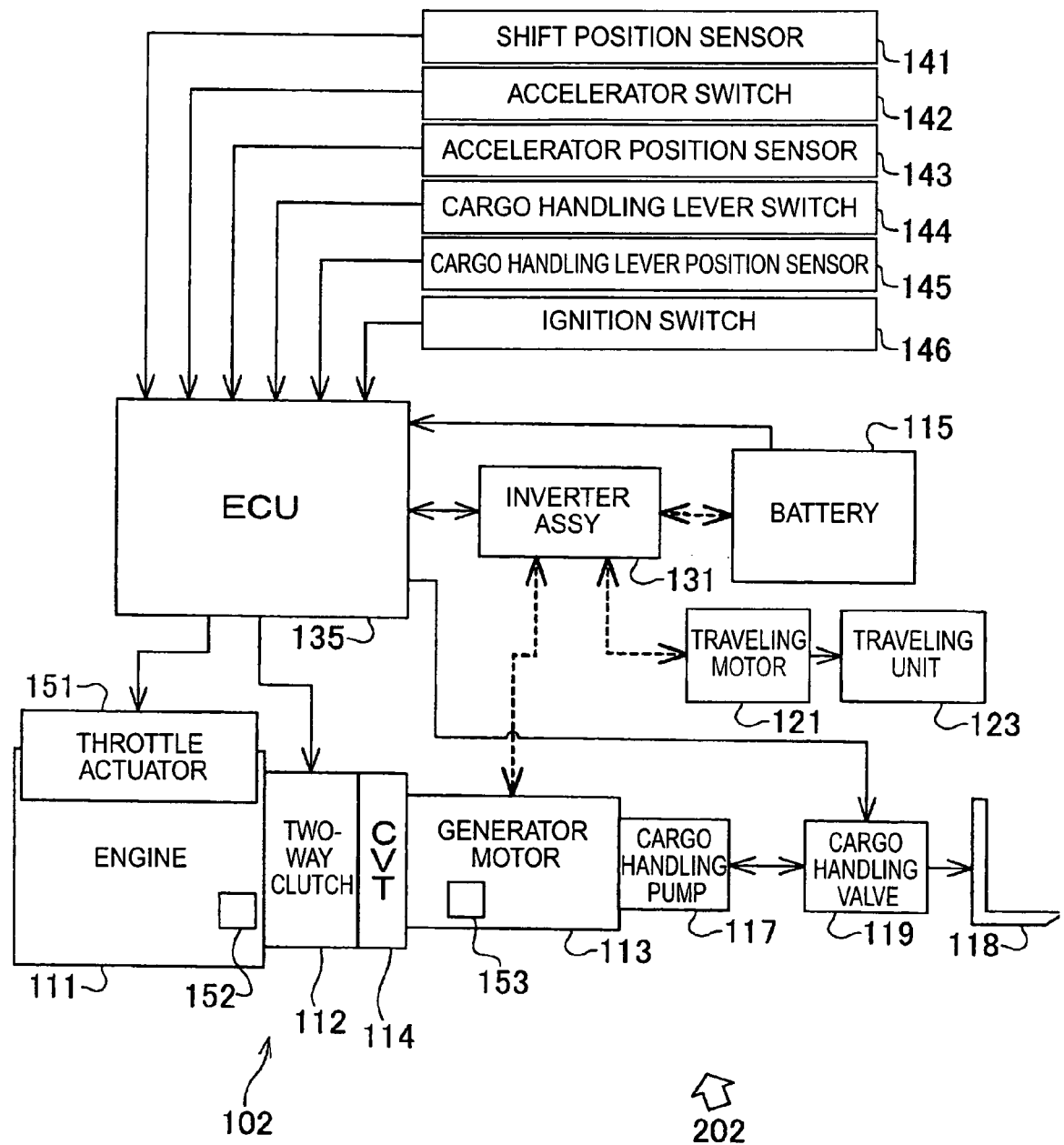
FIG. 3 is a block diagram showing a forklift according to a modification.

As in a cargo handling apparatus 202 for a forklift 102 shown in FIG. 3, it is possible to arrange a CVT (Continuously Velocity Transmission) 114 between the two-way clutch 112 and the generator motor 113. In this case, when the cargo handling load rapidly increases in the third mode, the transmission ratio of the CVT 114 is set to an appropriate level, whereby the engine RPM after the change of transmission ratio by the CVT 114 becomes equal to the RPM of the generator motor 113 at an early stage to cause the two-way clutch 112 in the first stage to be automatically connected, thereby making it possible to transmit the driving force of the engine 111 to the cargo handling pump 117. Thus, even if the cargo handling load increases, it is possible to assist the generator motor 113 by the engine 111 at an early stage, thereby making it possible to prevent the generator motor 113 from being overcharged.

In the construction of FIG. 3, it is also possible to adopt an arrangement in which, even after the engine RPM after the change of transmission ratio by the CVT 114 has become equal to the RPM of the generator motor 113 and the two-way clutch 112 in the first state has been automatically connected, control is effected to change the transmission gear ratio of the CVT 114 in response to an increase in engine RPM. Due to this arrangement, even while the RPM of the engine 111 increases from a low level until it becomes equal to the RPM of the generator motor 113, it is possible to transmit the driving force of the engine 111 to the cargo handling pump 117. Further, it is also possible for the CVT 114 to be arranged between the two-way clutch 112 and the engine 111.

The apparatus layout for the generator motor 113, the engine 111, etc. is not restricted to the one shown. For example, instead of being arranged coaxially with the engine 111, the generator motor 113 may also be arranged at a side of the engine 111.

While in this embodiment the cargo handling lever position sensor 145 serves as the cargo handling load detecting means, it is also possible to adopt some other arrangement. For example, it is possible to adopt an arrangement in which the pressure of the pressure oil discharged from the cargo handling pump 117 is detected by a pressure sensor, thereby judging the cargo handling load (resistance load) to be high when the pressure detected is high. Further, it is also possible to provide a load sensor at an appropriate position on the fork 118 to detect the weight of a cargo when lifting the cargo by the fork 118, thereby judging the cargo handling load to be high when the weight of the cargo detected is large. Of course, it is also possible to adopt a construction in which the detection values of the cargo handling lever position sensor 145 and the pressure sensor, the load sensor, etc. are combined with each other to comprehensively judge the magnitude of the cargo handling load.

In the above embodiment, the degree of rapidity in an increase in cargo handling load detected by the cargo handling load detecting means is calculated to control an increase in the output of the generator motor 113 described above and an increase in engine RPM. This, however, should not be construed restrictively. It is also possible to control an increase in the output of the generator motor 113 and an increase in engine RPM on condition that the detected resistance load value itself is not less than a predetermined value.

While in the above embodiment the cargo handling pump 117 supplies working fluid (pressure oil) under pressure to the cargo handling valve 119, it is also possible to provide the forklift 101 with a hydraulic power steering device, a hydraulic brake device, etc., thereby distributing pressure oil under pressure not only to the cargo handling valve 119 but also to such devices as mentioned above. In this case, the single cargo handling pump 117 can serve as the pressure oil supply source for the power steering device, the brake device, etc., whereby the number of components is reduced to achieve a reduction in size, and further, a reduction in cost.

The construction of the two-way clutch 112 can be changed from the one described above with reference to FIGS. 2A and 2B to some other construction. Further, it is also possible to adopt a two-way clutch which can assume a third state in which the driving force from the engine 111 is not transmitted to the generator motor 113 and in which the driving force of the generator motor 113 is not transmitted to the engine 111, either.

The load to be driven by the engine 111 and the generator motor 113 can be changed from the cargo handling pump 117 to some other load (for example, hydraulic pump for driving a power steering device) Further, the operating apparatus of the present invention is not restricted to a forklift, but is applicable to industrial vehicles in general for conducting cargo handling and other operations.

What is claimed is:

1. An operating apparatus for a working industrial vehicle, comprising: an engine; a generator motor; a two-way clutch provided between the engine and the generator motor; an electricity storage means; a load driven by at least one of the engine and the generator motor; a working load detecting means for detecting the magnitude of a resistance load during operation of the load; and a control means electrically connected to the engine, the generator motor, the two-way clutch, the electricity storage means, and the working load detecting means, wherein the control means switches the generator motor between a generator mode in which driving force of the engine is transmitted to the generator motor through the two-way clutch to generate power to be stored in the electricity storage means, and an electric motor mode in which the generator motor is supplied with driving power from the electricity storage means to function as an electric motor, wherein the two-way clutch can be switched between a first state in which transmission of driving force from the engine to the generator motor is allowed and in which transmission of driving force from the generator motor to the engine is prevented, and a second state in which the transmission of the driving force from the generator motor to the engine is allowed and in which the transmission of the driving force from the engine to the generator motor is prevented, wherein when the resistance load detected by the working load detecting means is small, the control means sets the two-way clutch to the first state, sets the engine in one of a stopped state and an idling state, and sets the generator motor to the electric motor mode so that the load is driven to conduct operation, wherein when, during the operation, the working load detecting means detects an increase in the resistance load in excess of a predetermined level, the control means starts an increase in RPM of the engine while increasing an output of the generator motor in the electric motor mode, and wherein when the RPM of the engine becomes equal to the RPM of the generator motor, the two-way clutch in the first state is automatically connected, and the driving force of the engine is transmitted to the load through the two-way clutch.

2. An operating apparatus for a working industrial vehicle according to claim 1, wherein the engine can be started by setting the two-way clutch to the second state by the control means and by driving a crankshaft of the engine by the generator motor in the electric motor mode.

3. An operating apparatus for a working industrial vehicle according to claim 1, wherein when a charging amount of the electricity storage means is larger than a predetermined charging amount, the control means sets the two-way clutch to the second state, and the generator motor in the electric motor mode drives a crankshaft of the engine.

4. An operating apparatus for a working industrial vehicle according to claim 1, wherein when the resistance load detected by the working load detecting means is large, the control means sets the two-way clutch to the second state, and the driving force of the generator motor in the electric motor mode and of the engine is transmitted to the load.

* * * * *